United States Patent
Newman et al.

(10) Patent No.: US 11,470,250 B2
(45) Date of Patent: Oct. 11, 2022

(54) METHODS AND APPARATUS FOR SHEAR CORRECTION IN IMAGE PROJECTIONS

(71) Applicant: GoPro, Inc., San Mateo, CA (US)

(72) Inventors: David Newman, San Diego, CA (US); Daryl Stimm, Encinitas, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 17/139,395

(22) Filed: Dec. 31, 2020

(65) Prior Publication Data
US 2021/0203844 A1 Jul. 1, 2021

Related U.S. Application Data

(60) Provisional application No. 62/955,950, filed on Dec. 31, 2019.

(51) Int. Cl.
*H04N 5/247* (2006.01)
*H04N 5/232* (2006.01)
*G06T 3/40* (2006.01)
*H04N 5/262* (2006.01)

(52) U.S. Cl.
CPC ....... *H04N 5/23238* (2013.01); *G06T 3/4038* (2013.01); *H04N 5/247* (2013.01); *H04N 5/2628* (2013.01)

(58) Field of Classification Search
CPC .. H04N 5/23238; H04N 5/247; H04N 5/2628; G06T 3/4038
See application file for complete search history.

(56) References Cited

U.S. PATENT DOCUMENTS

| | | | | |
|---|---|---|---|---|
| 2007/0159524 A1* | 7/2007 | Kim | ...................... | G06T 3/4038 348/36 |
| 2008/0273598 A1* | 11/2008 | Shon | ...................... | H04N 19/60 375/E7.095 |
| 2014/0104378 A1* | 4/2014 | Kauff | ................... | G02B 27/143 348/38 |
| 2014/0300686 A1* | 10/2014 | Campbell | .......... | H04N 5/23238 348/36 |
| 2014/0340427 A1* | 11/2014 | Baker | .................. | H04N 13/363 345/641 |
| 2015/0062363 A1* | 3/2015 | Takenaka | ........... | H04N 5/23238 348/218.1 |

(Continued)

*Primary Examiner* — Thai Q Tran
*Assistant Examiner* — Jose M Mesa
(74) *Attorney, Agent, or Firm* — Wang Hardoon, P.C.

(57) ABSTRACT

Methods and apparatus for shear correction in spherical projections. Embedded devices generally lack the compute and/or memory resources to implement two-dimensional (2D) stitches for spherical projections. Objects (such as a mounting fixture) within a certain distance of the camera may experience a 2D "tear" or "shear" artifact when stitched. Various embodiments of the present disclosure perform two orthogonal 1D stitches: (i) latitudinally across the meridian and (ii) longitudinally along the meridian to approximate the effect of a 2D stitch. Notably, the 1D stitch may be less precise than a true 2D stitch, however the image portion being stitched (e.g., the camera mount) is not the user's subject of interest and can be rendered much more loosely without adverse consequence. Temporal smoothing optimizations are additionally disclosed.

20 Claims, 14 Drawing Sheets

(56) References Cited

U.S. PATENT DOCUMENTS

| | | | |
|---|---|---|---|
| 2015/0350489 A1* | 12/2015 | Hasegawa | H04N 1/3876 358/449 |
| 2018/0025467 A1* | 1/2018 | Macmillan | G06T 7/0002 382/190 |
| 2020/0092582 A1* | 3/2020 | Xiu | G06T 15/00 |

* cited by examiner

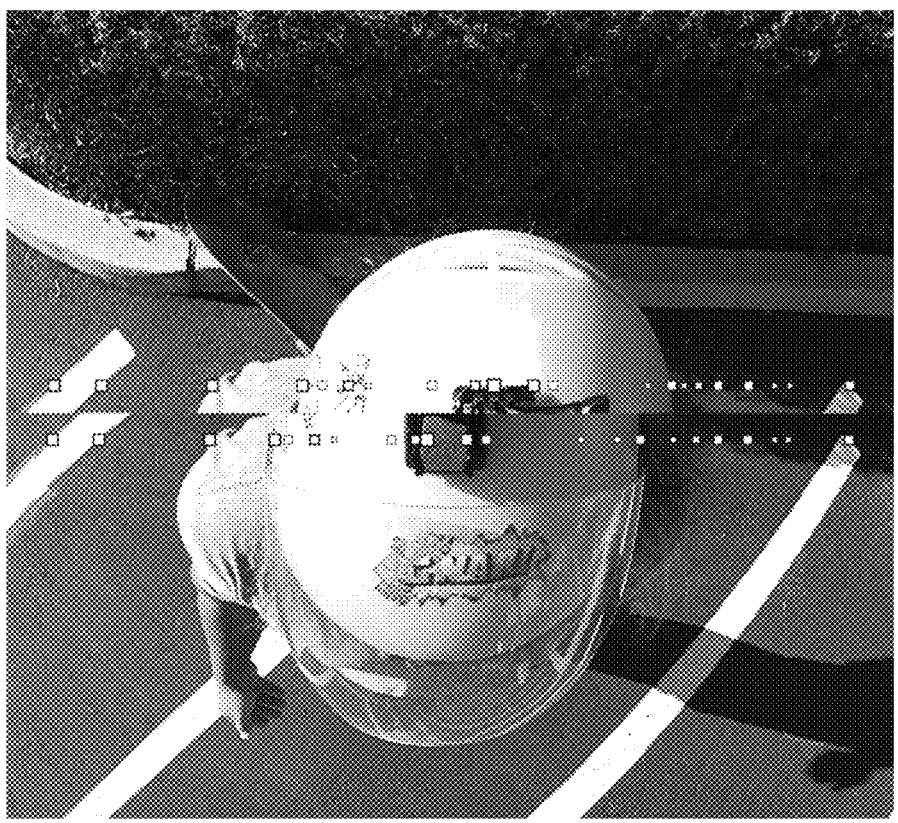
FIG. 5

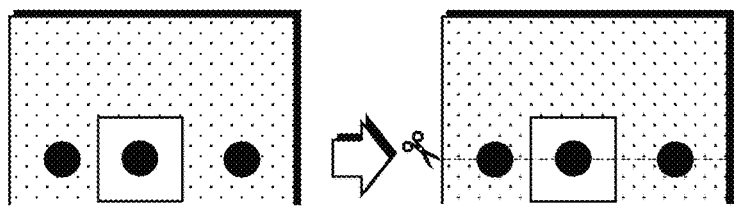
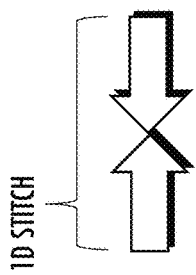
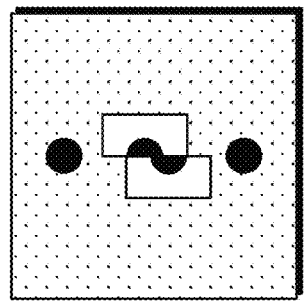
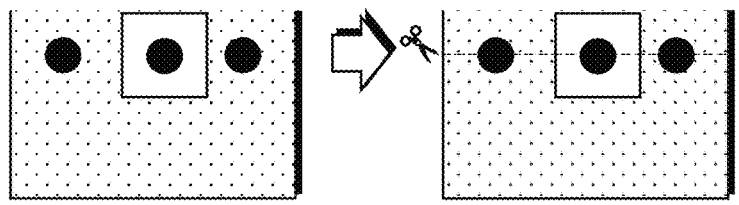
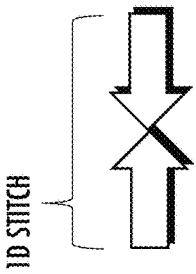
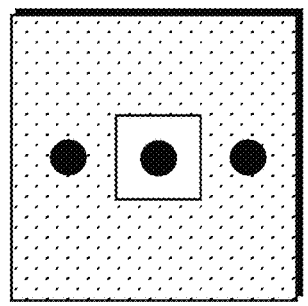
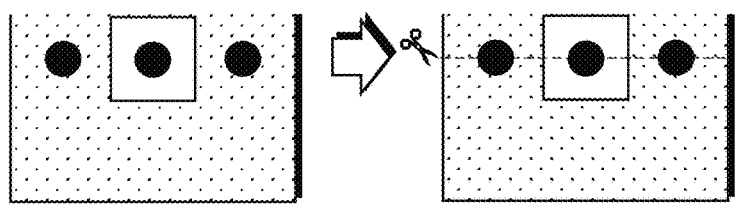
FIG. 6

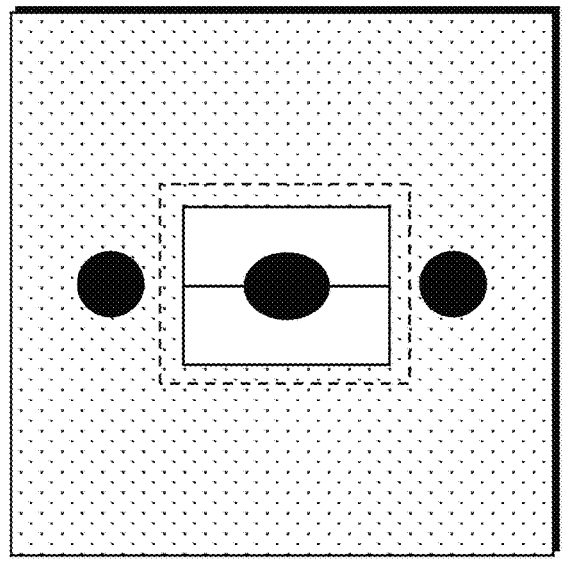
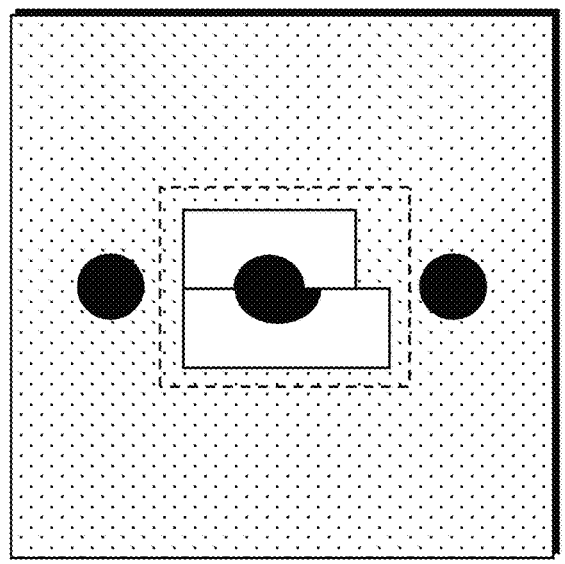
FIG. 12

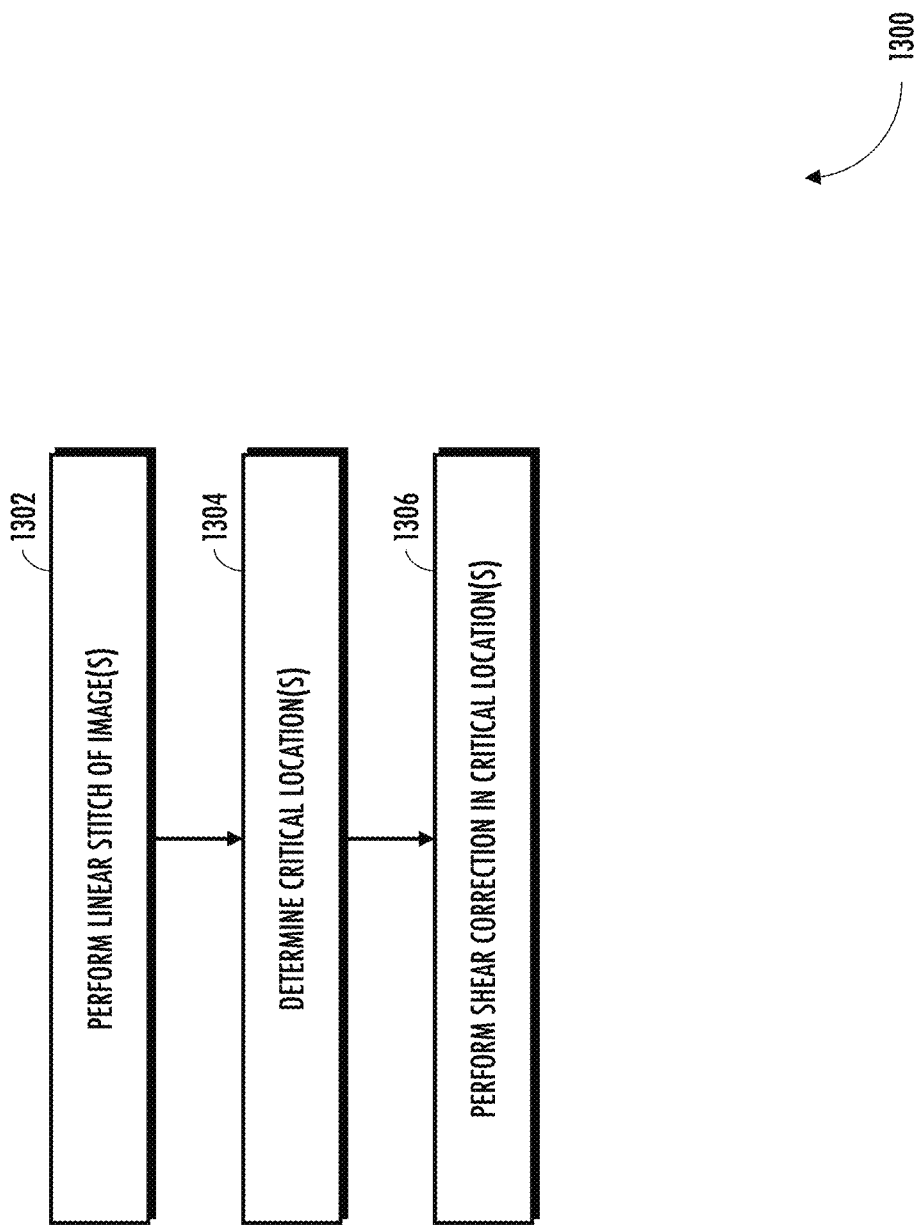

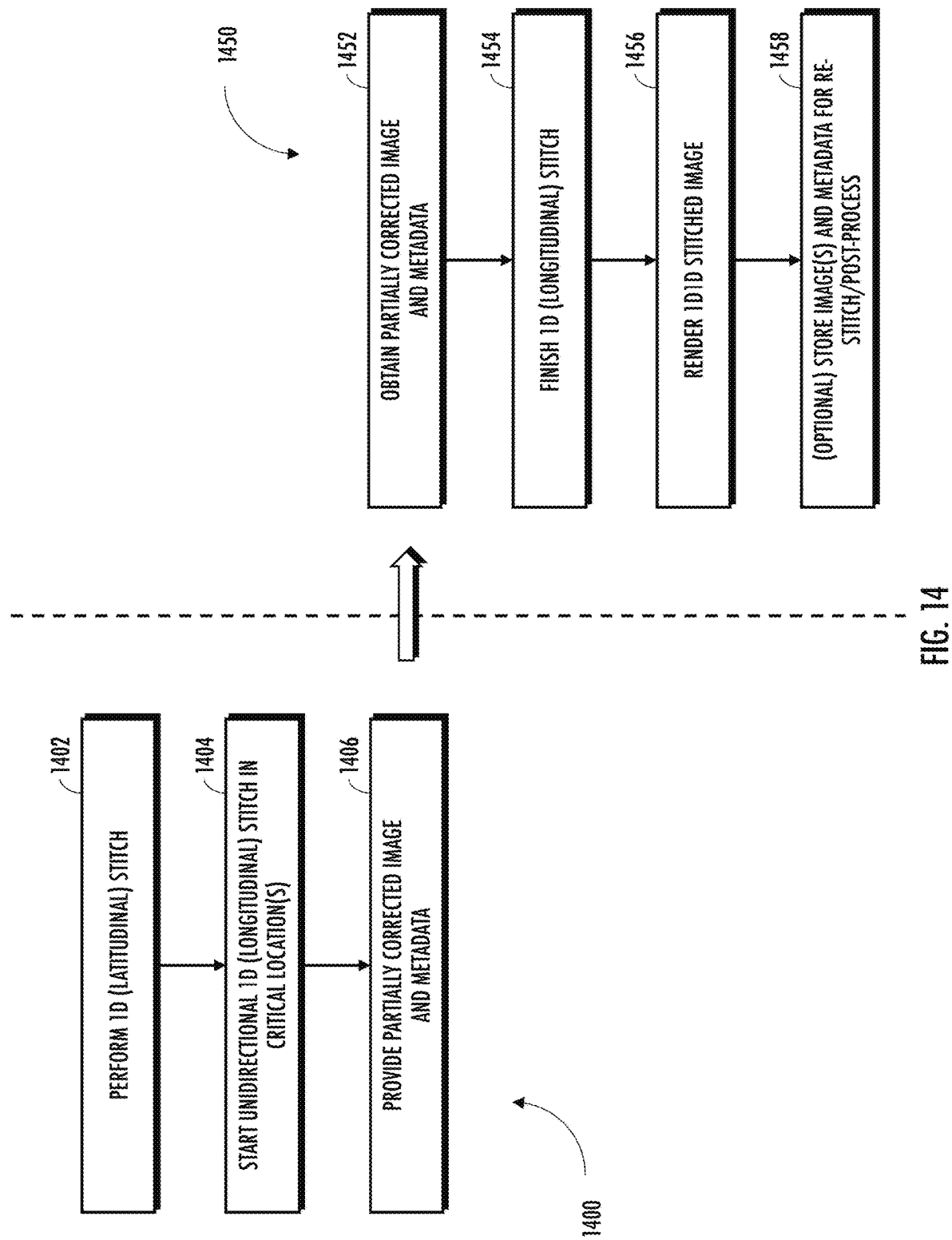

METHODS AND APPARATUS FOR SHEAR CORRECTION IN IMAGE PROJECTIONS

PRIORITY

This application claims the benefit of priority to co-owned U.S. Provisional Patent Application No. 62/955,950 entitled "METHODS AND APPARATUS FOR SHEAR CORRECTION IN PROJECTIONS" filed Dec. 31, 2019, the contents of which are incorporated herein by reference in its entirety.

RELATED APPLICATIONS

This application is generally related to the subject matter of co-owned U.S. patent application Ser. No. 16/503,320 filed Jul. 3, 2019 and entitled "APPARATUS AND METHODS FOR PRE-PROCESSING AND STABILIZATION OF CAPTURED IMAGE DATA", and U.S. patent application Ser. No. 16/572,383 filed Sep. 16, 2019 and entitled "METHODS AND APPARATUS FOR MAXIMIZING CODEC BANDWIDTH IN VIDEO APPLICATIONS", each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

This disclosure relates generally to the field of image processing techniques. More particularly, the present disclosure relates to systems, computer programs, devices, and methods for capturing, processing, and presenting wide field-of-view (FOV) images.

DESCRIPTION OF RELATED TECHNOLOGY

Spherical images are typically obtained by capturing multiple images with overlapping fields of view from different cameras and combining (also known as "stitching") these images together in order to provide a two-dimensional projection. Conventional stitching algorithms may result in undesirable artifacts due to imperfections in the stitching process.

Different electronics devices may have different mobility, computational capabilities, display capabilities, power limitations, and/or other operational considerations. For example, a consumer device such as a mobile phone or multi-camera capture device may be used to capture source photographs during an outdoor activity and/or quickly view an image in the device's native resolution, however it may lack the computational power for higher-resolution image stitching techniques. Similarly, while a laptop or tower computer may have more than adequate compute power to perform such stitching, they are poorly suited to outdoor activities.

SUMMARY

The present disclosure provides, inter alia, systems, methods, and apparatus for shear correction in image projections. In one aspect, methods, and apparatus for correcting shear in image projections are disclosed. One exemplary method embodiment includes: stitching a first image and a second image in a first dimension to create a partially stitched image; determining a critical location within the partially stitched image; and stitching the partially stitched image in a second dimension; wherein the first dimension and the second dimension are orthogonal.

In one aspect, methods, and apparatus for partially correcting shear artifacts in image projections are disclosed. One exemplary apparatus embodiment includes: a first camera and a second camera; a processor; and a non-transitory computer-readable medium comprising one or more instructions. In one exemplary embodiment, the one or more instructions when executed by the processor, causes the apparatus to: capture a first image and a second image; partially stitch the first image and the second image in at least a first dimension to create a partially stitched image; and provide the partially stitched image to an other device.

Another exemplary apparatus embodiment includes: a display; a processor; and a non-transitory computer-readable medium comprising one or more instructions. In one exemplary embodiment, the one or more instructions when executed by the processor, causes the apparatus to: obtain a partially stitched image; perform shear correction in a critical location of the partially stitched image to generate a corrected image; and render the corrected image.

Other features and advantages of the present disclosure will immediately be recognized by persons of ordinary skill in the art with reference to the attached drawings and detailed description of exemplary embodiments as given below.

BRIEF DESCRIPTION OF THE DRAWINGS

FIG. 5 depicts a top view of an action camera mounted to a helmet, useful for illustrating various aspects of the present disclosure.

FIG. 6 provides a side-by-side graphical comparison of the differences in parallax between inline and offset body types, useful for illustrating various aspects of the present disclosure.

FIG. 12 is a graphical representation of differences between different one-dimensional (1D) stitching techniques, consistent with the various principles described herein.

FIG. 13 is a logical flow diagram of a generalized method for shear correction in image projections, consistent with the various principles described herein.

FIG. 14 depicts logical flow diagrams of one exemplary shear correction that for a mobile device ecosystem, consistent with the various principles described herein.

DETAILED DESCRIPTION

In the following detailed description, reference is made to the accompanying drawings which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without departing from the spirit or scope of the present disclosure. It should be noted that any discussion herein regarding "one embodiment", "an embodiment", "an exemplary embodiment", and the like indicate that the embodiment described may include a particular feature, structure, or characteristic, and that such particular feature, structure, or characteristic may not necessarily be included in every embodiment. In addition, references to the foregoing do not necessarily comprise a reference to the same embodiment. Finally, irrespective of whether it is explicitly described, one of ordinary skill in the art would readily appreciate that each of the particular features, structures, or characteristics of the given embodiments may be utilized in connection or combination with those of any other embodiment discussed herein.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The Spherical Camera Ecosystem

Figure 1:
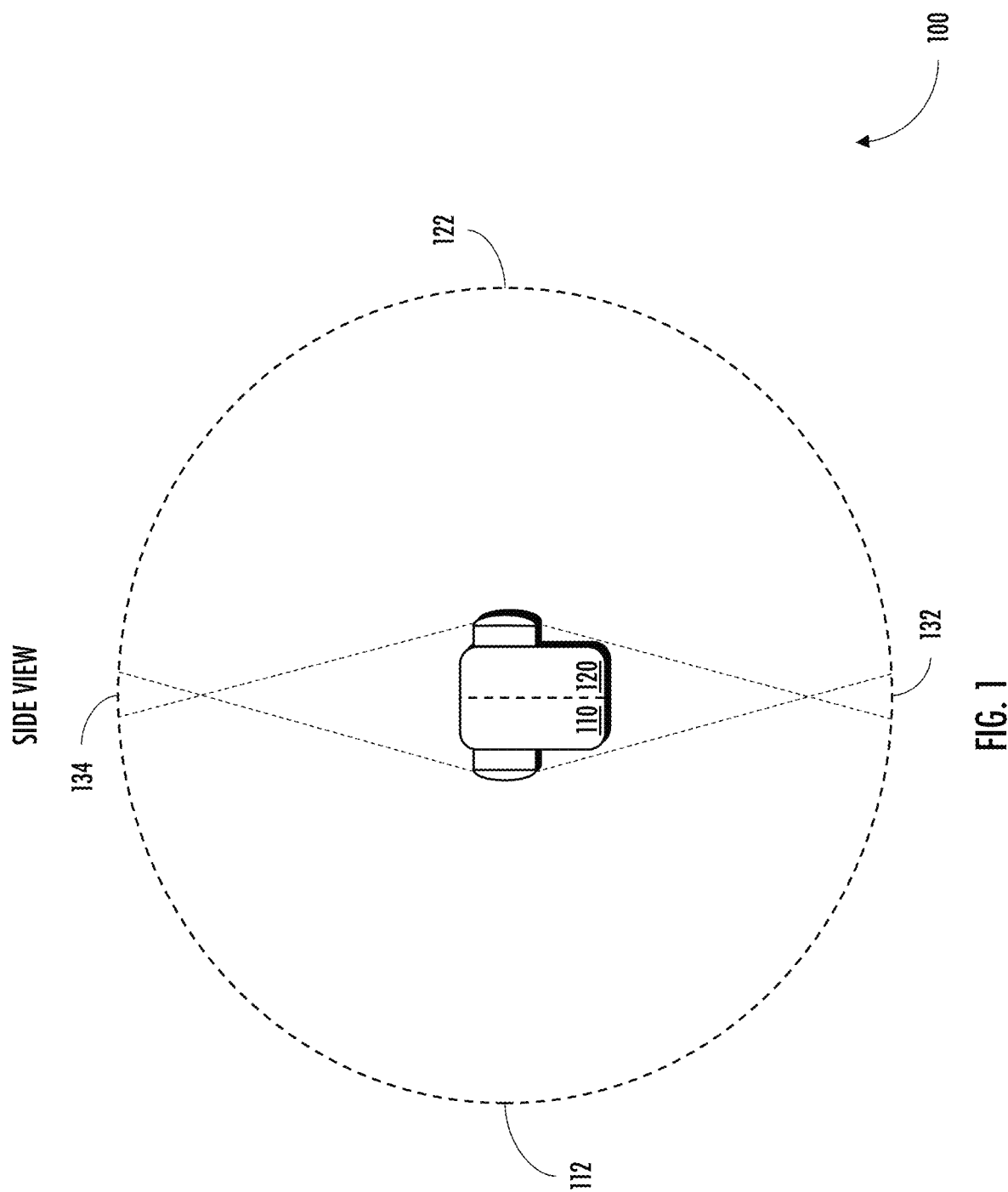
FIG. 1 is a side view of a Janus-style camera for capturing spherical content

FIG. 1 is a side view of a Janus-style camera for capturing spherical content. As shown in FIG. 1, the camera system 100 includes a first camera 110 capturing a first field of view (FOV) 112 and a second camera 120 capturing a second FOV 122. In operation, the first camera 110 may be a "front-facing" camera 110, and the second camera 120 may be a "back-facing" camera facing in an opposite direction of the front-facing camera 110. While the designations of front-facing and back-facing are useful in describing the example processes described herein, these designations are arbitrary and the camera system 100 may operate in any absolute or relative orientation.

The fields of view 112, 122 may each include a hyperhemispherical FOV that captures slightly greater than a 180° range. The fields of view 112, 122 overlap in regions 132, 134 near their respective boundaries by n degrees (e.g., where n equals 1°, 5°, 10°, etc.) These overlapping regions 132, 134 may be used for the stitching of separately captured images obtained by the respective cameras 110, 120, as will be described in further detail below.

As a brief aside, image stitching combines multiple images with overlapping fields of view by identifying similar image textures, features, etc. Stitching techniques commonly entail e.g., combining multiple images to ideally produce an imperceptible (or minimally perceptible) transition between the two (2) hemispheres of the spherical projection. Image stitching techniques commonly include e.g., edge detection, motion detection, parallax correction, perspective warping, blending, lighting adjustment, and/or any number of other image modifications commonly used in the related art.

Stitching complexity (processing cycles, memory accesses, etc.) is directly related to the search space of the stitch. For example, a one-dimensional (1D) stitch searches through a set of pixels (i.e., a 1D array of N pixels) taken from a row or column in a second image to find potential matches; this 1D array of N pixels is the "search space" of the stitch. The search complexity for a 1D stitch scales as a linear function of N (in computer science theory, this is referred to as a complexity of O(N)). In contrast, two-dimensional (2D) stitching searches for matches in a 2D array pixels (row by column) in a second image; this is a N×N search space i.e., $O(N^2)$. In other words, 2D stitching is quadratically more difficult than 1D stitching.

Embedded devices are so named because their computing resources are "embedded" in the device, and generally considered unchangeable once deployed. For example, an action camera (such as is manufactured by GoPro, Inc.) is designed to tightly couple onboard processing and memory resources for video capture. Similarly, a smart phone may tightly couple onboard processing and memory resources for generic user applications. Notably, in order to optimize performance, embedded devices are usually special purpose devices and are not expected to (nor capable of) handling high performance computing.

In view of the foregoing considerations (computational expense and resource limitations), stitching has not historically been performed in embedded devices. Instead, spherical content was exported to high end workstations for high quality 2D stitching. While the "camera-workstation" ecosystem remains an important market segment, new techniques have enabled one-dimensional (1D) stitching within embedded device ecosystems e.g., a "camera-smart phone", etc. One such example is described within U.S. patent application Ser. No. 16/503,320 filed Jul. 3, 2019 and entitled "APPARATUS AND METHODS FOR PRE-PROCESSING AND STABILIZATION OF CAPTURED IMAGE DATA", which is incorporated herein by reference in its entirety. As described in greater detail therein, an in-camera stitch can greatly improve data compression and stabilization and also enable playback on embedded display devices (such as smart phones) using commodity processing components.

Figure 2:
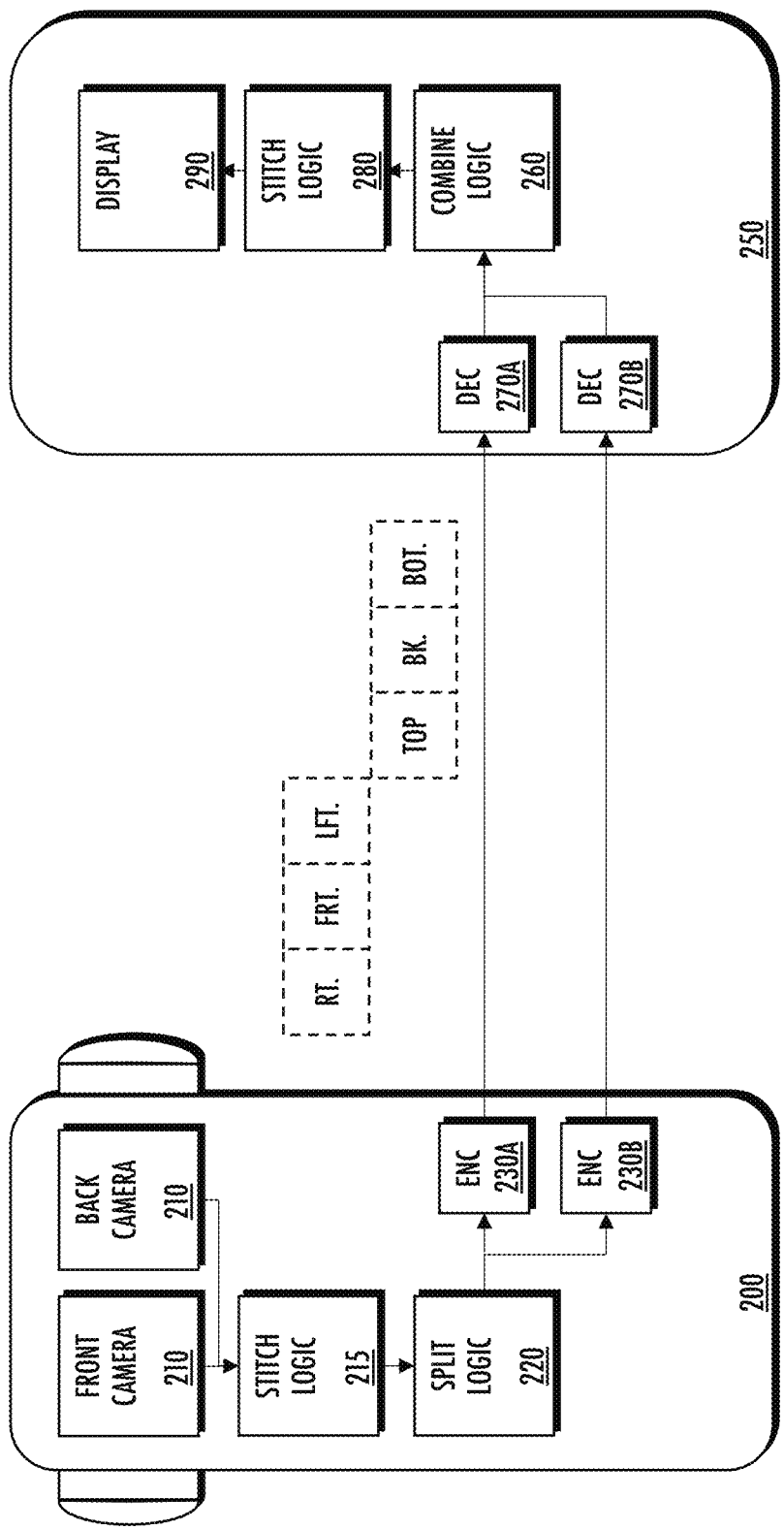
FIG. 2 is a logical representation of one embedded device system, useful for illustrating various aspects of the present disclosure.

FIG. 2 is a logical representation of one exemplary embedded device system useful for illustrating various aspects of the present disclosure. In one exemplary embodiment, the capture device 200 is an action camera (such as is manufactured by GoPro, Inc.) The capture device 200 includes a front camera and a back camera 210, arranged in the aforementioned Janus-style (back-to-back) configuration. During operation, each camera captures a hyper-hemispherical FOV image; the captured hemispheric content is stitched together as a spherical projection by in-camera stitching logic 215. Thereafter, the spherical projection is provided to splitter logic 220 for delivery via one or more encoders 230A, 230B. The output of the encoders 230A, 230B are A/V container files (e.g., MPEG, HEVC, or another similar media format) suitable for network transfer and/or media transfer (e.g., memory cards).

In one embodiment, the display device 250 is a smart phone (or similar mobile compute device). The A/V container files of encoders 230A, 230B are received at the display device 250 (e.g., via a wireless or wireline network interface, memory media, etc.) The display device 250 decodes the A/V container files using one or more decoders 270A, 270B. The A/V container files may include metadata information that enables combiner logic 260 to properly partition out the split portions contained within the A/V container(s). The split images can be stitched via stitch apparatus 280. The stitch apparatus 280 may recombine the decoded image portions from the decoders 270A, 270B. In some implementations, the stitching algorithm for the stitch apparatus 280 may re-stitch the decoded image portions based on metadata information contained within the A/V container. Display 290 may display the stitched images.

The foregoing discussions of the capture device 200 and display device 250 are described in the context of logic, artisans of ordinary skill in the related arts will readily appreciate that such logic may be implemented via processors executing firmware/software from non-transitory computer-readable media, hardware accelerators, and/or other processing units (e.g., DSP, GPUs, FPGAs, PLDs).

Figure 3:
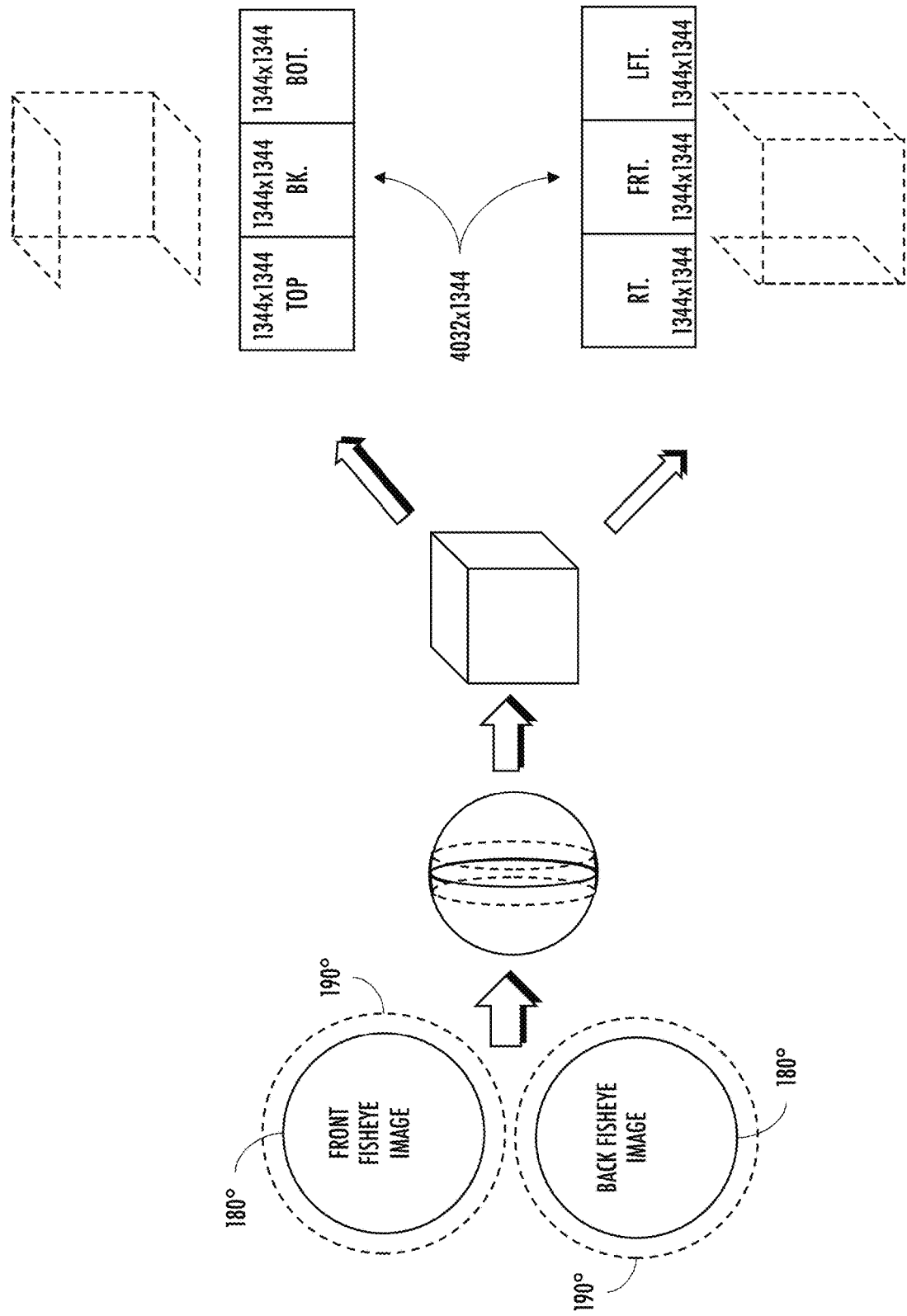
FIG. 3 is a graphical representation of spherical projections, useful for illustrating various aspects of the present disclosure.

As shown in FIG. 3, various embodiments of the present disclosure may re-project fisheye image data to an Equi-Angular Cubemap (EAC) spherical projection; the EAC projection may be further split into non-traditional image sizes (e.g., 4032×1344) for the aforementioned transfer via commodity codecs (e.g., HEVC Level 5.1). The system of FIG. 3, and various other attendant benefits thereof, are also described in greater detail within U.S. patent application Ser. No. 16/572,383 filed Sep. 16, 2019 and entitled "METHODS AND APPARATUS FOR MAXIMIZING CODEC BANDWIDTH IN VIDEO APPLICATIONS", which is incorporated herein by reference in its entirety. Examples of non-traditional aspect ratios/frame rates that are enabled by the foregoing system include without limitation, spherical projections of e.g., 8 K@24 fps, 7 K@30 fps, 6 K30 fps, 5.6 K@30 fps (i.e., 1080p in any direction at 30 fps), etc.

In-Line versus Offset Camera Design

Figure 4:
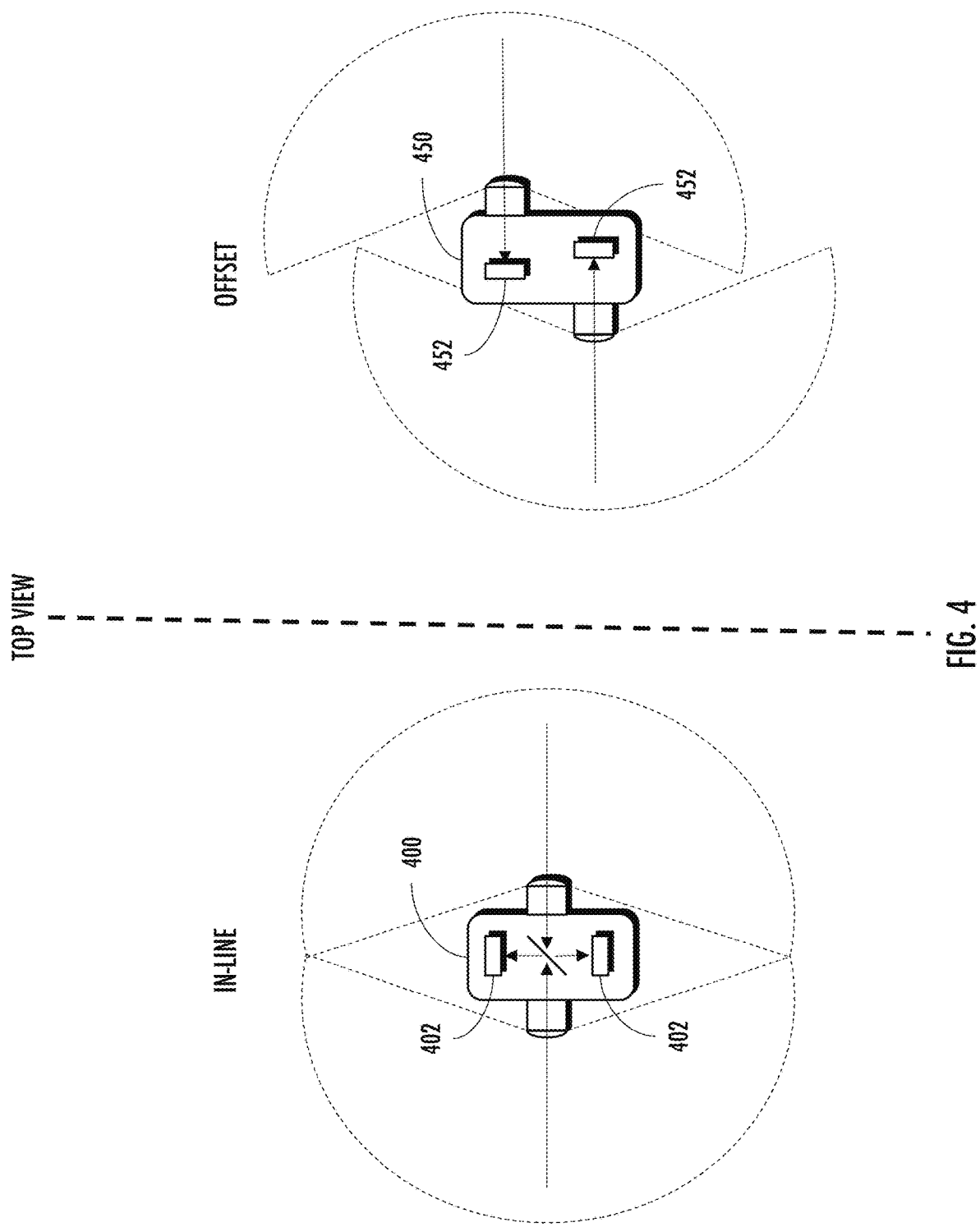
FIG. 4 is a top view comparison of different Janus-style camera bodies, useful for illustrating various aspects of the present disclosure.

Janus-style cameras are generally divided into two (2) construction types. FIG. 4 illustrates the different constructions from a top view: (i) an in-line camera body 400, and (ii) an offset camera body 450.

The in-line camera body 400 centers the front-facing and back-facing camera over a mirror element; the mirror element reflects light to hit image sensors 402. The mirror is an essential component of in-line camera bodies because it shortens the distance between the lenses and minimizes parallax effects. Unfortunately, the optical qualities of the mirror can significantly impact the quality of the captured image. Specifically, the mirror introduces Modulation Transfer Function (MTF) noise. MTF noise cannot be corrected with post-processing (i.e., the blur is in the originally captured data). As a practical matter, in-line camera manufacturers trade-off mirror cost and/or quality for MTF noise; however, even the highest quality mirrors introduce some noise.

Unlike the in-line camera body 400, the offset camera body 450 centers the front-facing and back-facing camera directly over their corresponding image sensors 452; however, in order to minimize camera distance, the lens sensor assemblies are staggered. The offset camera body 450 has a distinct image quality advantage, since light is pristinely captured by the image sensor. Unfortunately, the offset camera body 450 is not without drawbacks. In particular, the offset camera body 450 may introduce a "shear" or "tear" effect when the stagger distance is significant relative to the captured object distance; this distance is heretofore referred to as the "critical distance."

For certain action cameras (such as is manufactured by GoPro, Inc.), the critical distance is ~1-2 feet from the camera. Usually, very little action occurs at these ranges; however, the camera's mount point (e.g., a helmet, tripod, handle, etc.) is within the critical distance. FIG. 5 is an actual image captured from a helmet-mounted camera; the front and back images are shown side by both with and without overlapping image data. Salient points (e.g., high contrast and/or edges) are highlighted to further demonstrate the shear visual effect. The tear is quite obvious at the helmet mount (within the critical distance); however, the shoulder and street (outside of the critical distance) are not affected.

FIG. 6 provides a side-by-side graphical comparison of the differences in parallax between inline and offset body types. In the illustrations, the white square corresponds to a subject which is within the critical distance, whereas the background patterned field is outside the critical distance.

The in-line camera of FIG. 6 captures the front and back images with some parallax effects due to the lens placements; however, the in-line construction can uniformly stitch across the ideal meridian of the spherical projection. In other words, each hyper-hemispherical capture is cut, and stitched together with a one-dimensional (1D) stitch that laterally spans across the meridian (the 1D stitch is perpendicular to the meridian).

Figure 7:
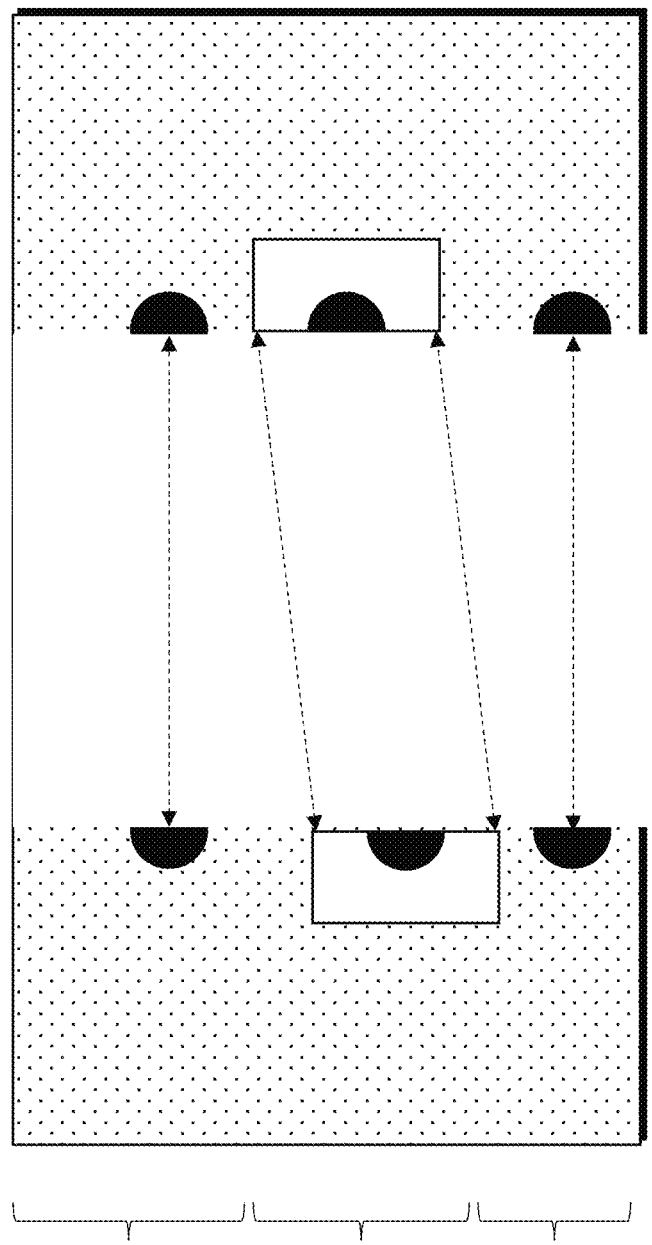
FIG. 7 provides a close-up view of the "shear" or "tear" artifact of FIG. 6, useful for illustrating various aspects of the present disclosure.

In contrast, the offset camera of FIG. 6 captures the front and back images with a slight offset from center. FIG. 7 provides a close-up of the "shear" or "tear" artifact. As shown, objects outside of the critical distance are only displaced latitudinally. In contrast objects within the critical distance experience both latitudinal and longitudinal displacement ("shear"). More generally, objects within the critical distance are "torn" in two dimensions (latitudinal and longitudinal) when an offset camera capture is uniformly stitched across the meridian.

As used herein, the terms "latitude", "latitudinal", "longitude", "longitudinal", etc. are borrowed from cartography, and used with reference to a camera that is mounted at the bottom (e.g., the "south pole", or "nadir"). The meridian refers to the longitudinal line that demarcates the hemispheres captured by the front and back facing cameras under ideal conditions.

From an aesthetic standpoint, shear visual artifacts can be undesirable; they detract from the user's immersive experience. Existing solutions e.g., "painting over the mount", and/or limiting the user's panning, may hide the effect, but are similarly distracting. To these ends, methods and apparatus are needed to enable shear artifact correction techniques in embedded device platforms.

Example Operation

As previously alluded to, usually only the camera mount lies within the critical distance. Since the camera mount is a physical fixture of the camera body, the location of tear artifacts (referred to hereinafter as the "critical location") is known and will persist over time. Various embodiments of the present disclosure leverage these assumptions to simplify shear correction in spherical projections.

Figure 8:
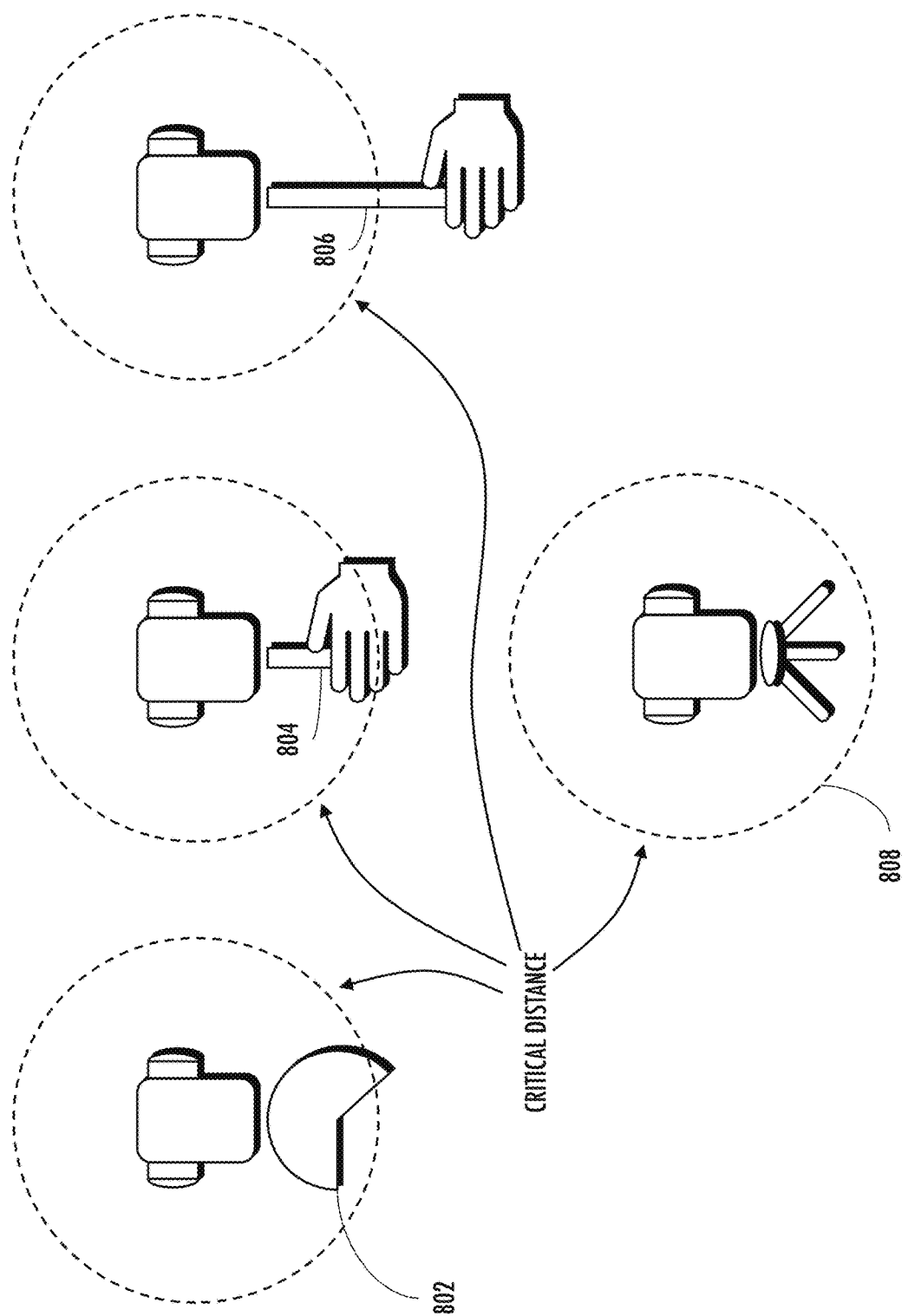
FIG. 8 is a graphical representation of different camera mounting apparatus, useful for illustrating various aspects of the present disclosure.

The size of the shear artifact is directly related to the size and shape of the object within the critical distance. Referring now to FIG. 8, different mount apparatus may be characterized by different critical location footprints; for example: a helmet 802, a short handle 804 (hand inside of critical distance), a long handle 806 (hand outside of critical distance), and a tripod 808 each have a distinctive critical location footprint.

In one exemplary embodiment, the critical location is statically configured (e.g., the bottom 90° FOV, etc.) Static configuration may be simple to implement; however, it may result in unnecessary shear correction and/or undesirable "false positive" correction. Thus, some embodiments may dynamically determine the critical location. For example, some cameras may include an infrared, radar, lidar, or other depth sensor to detect objects within the critical distance. Other variants may use active mounts (e.g., the mount identifies its type and/or depth profile to the camera) and/or user configuration (e.g., the user specifically identifies the mount to the camera).

Still other variants may use a hybrid of the above; for example, even if the mount is known, the user's hand positioning may still need correction (see e.g., short handle 804). Under these cases, active mount identification may be combined with a static configuration. As but one example, a short handled 804 mount is likely being handheld so a 30° FOV may be used instead of a much more conservative 90° FOV. Additionally, hybrid configurations may be particularly useful to reduce e.g., "false positives." For instance, a hand (or similar object) that briefly passes close to the camera may result in a false positive. However, a face (or similar object) that persists for some time, may be important for aesthetic reasons. Reducing false positives reduces unnecessary processing and memory burden.

While the foregoing discussion is presented in the context of one mount point, some cameras may have multiple mount points (e.g., mountable either at the top, the bottom, or both, etc.) and/or actively detect objects. Artisans of ordinary skill in the related art, given the contents of the present disclosure, may substitute other techniques for determining the location of objects in the critical distance with equal success.

Figure 9:
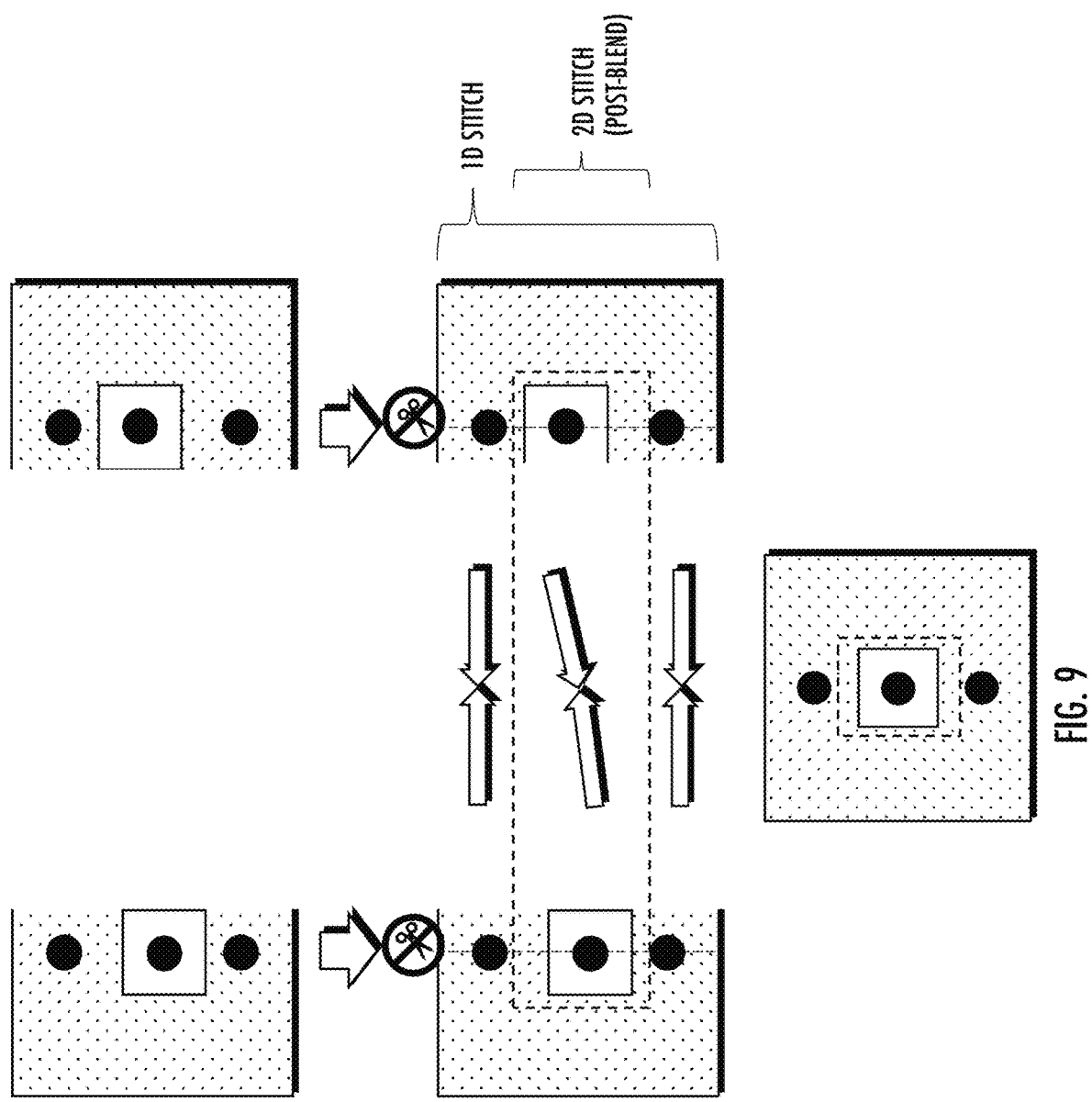
FIG. 9 is a graphical representation of one exemplary stitch, consistent with the various principles described herein.

FIG. 9 is a graphical representation of one exemplary stitch, consistent with the various principles described herein. As shown therein, a camera captures two hyper-hemispherical fisheye images. In some embodiments, the camera may convert the fisheye images into another spherical projection (such as an Equi-Angular Cubemap (EAC)), in other embodiments the camera may directly operate with fisheye image data. The hyper-hemispherical image content is one-dimensionally (1D) stitched across the meridian of the spherical projection. In one variant, information about the 1D stitch is further stored within a "warp track".

As a brief aside, the exemplary warp track is metadata generated by the in-camera stitch logic; the warp track defines how the stitching logic decided to stretch or shrink each pixel at the stitch line. Notably, the warp track metadata can be very small; e.g., for a 5.6 K spherical image, the warp track is only 1 kilobyte (KB). The warp track can greatly improve blending and subsequent re-stitching. Specifically, the warp track identifies whether the image was warped to favor either the front or back camera.

As used herein, the term "stitch", "stitching", etc. refers to image modifications that are performed to resolve image differences attributed to parallax between the cameras. In contrast, the term "blend", "blending", etc. refers to image modifications that are performed to resolve differences attributed to exposure, shutter speed, and/or other capture conditions.

After the 1D stitch, instead of cutting the overlap region, the overlap region data is used to perform an image blend. Specifically, the different lighting conditions for each camera sensor may result in different exposure times and shutter speeds which affect color, white balance, and contrast in unpredictable ways. These differences in shooting conditions can create a visible "exposure transition" in the resulting images. Empirically, the exposure transition is difficult (if not impossible) to blend from post-stitched images (non-RAW image formats do not include enough information to infer e.g., exposure, shutter speed, etc.) Consequently, an in-camera blend is performed which may incorporate one or more of e.g., the 1D warp track, stitched image data, and/or on-camera RAW data.

As a brief aside, there are many different image processing techniques that may be used to blend images; one commonly used technique is so-called "multi-band blending." In multi-band blending, an image can be separated into its constituent frequency components via an iterative process of blurring and subtraction. This is analogous to a two-dimensional wavelet transform (a decomposition of a signal into a set of contractions, expansions, and translations of a basis wavelet) For example, an image may be downsampled to a half-resolution image. The half-resolution image is then upsampled to create an upsampled ¼ resolution image. The residual image is created by subtracting the upsampled image from the original image. This process is iteratively repeated to the extent required (each iteration requires more processing resources but preserves fidelity across a broader frequency range). Notably, the residual "pyramid" of images contains all of the difference information necessary to recreate the original image from the downsampled counterpart (which may be a single pixel for images having evenly divisible dimensions).

In order to blend two images, each image is decomposed into pyramid image representations of the two images. A "mask" pyramid is constructed that defines a blend weight between the first and the second image pyramids for each pyramid level. For each pyramid level, the levels of the two pyramids are combined based on the weights of the mask pyramid and summed together. Collapsing together all the level-wise summations, generates a resulting output blended image.

Many variants of multi-band blending exist for a variety of different applications and/or constraints. For example, some implementations may only use a subset of the image pyramid tiers, so as to reduce processing and/or memory burden (resulting in some image information loss). Similarly, some implementations may use different masking weights; for example, linear weights and gaussian weights. Yet other variants may adjust how upsampling and/or downsampling are performed; for example, "non-power-of-two" images cannot be evenly halved (downsampled); a variety of techniques exist to handle the remainders.

Figure 10:
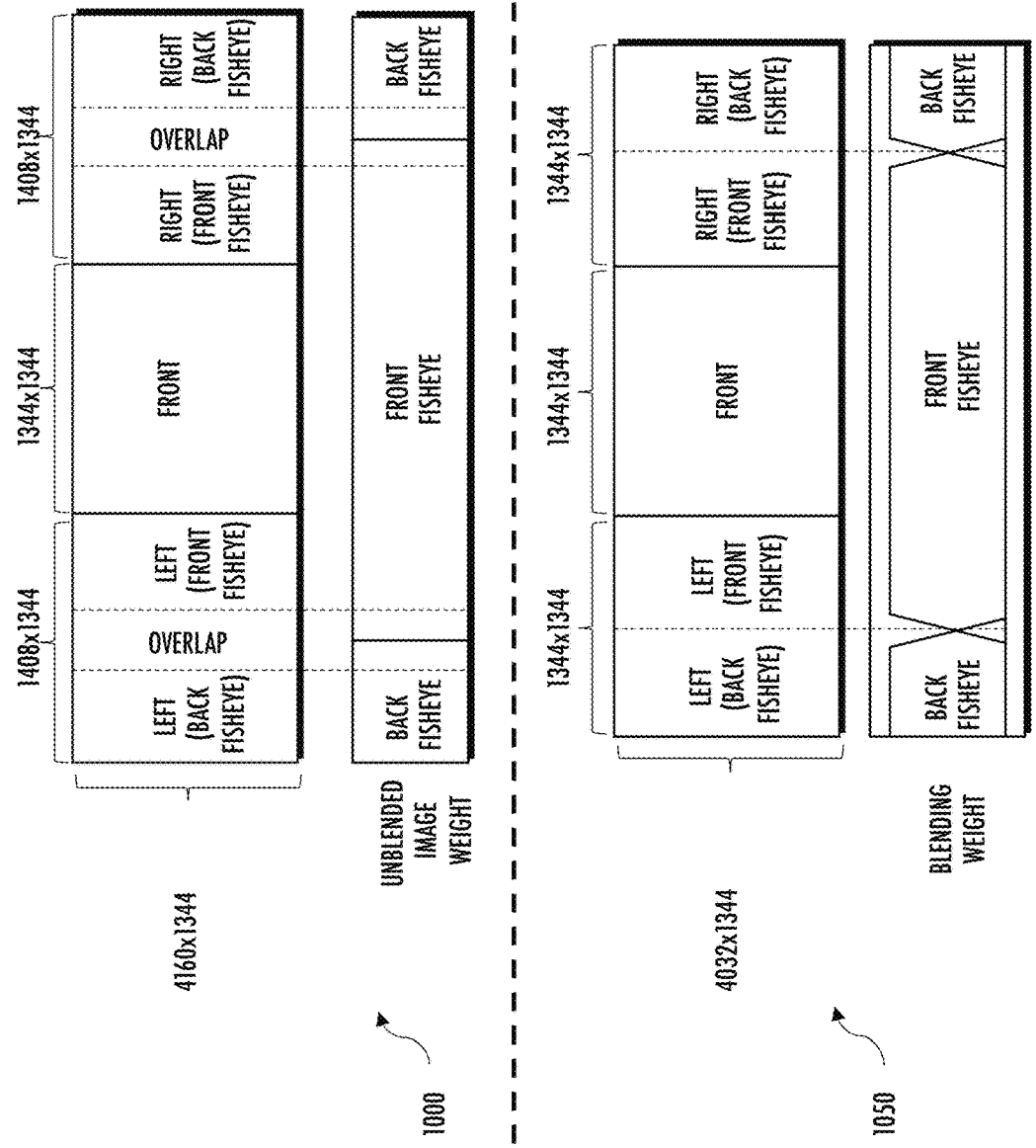
FIG. 10 is a graphical representation of a modified Equi-Angular Cubemap (EAC) segment that includes overlap data to enable post-stitch blending, useful in conjunction with various embodiments described herein.

Referring now to FIG. 10, an exemplary embodiment of the present disclosure uses a modified EAC segment that includes overlap data to enable post-stitch blending. The illustrated example is modified from an EAC spherical projection of 8064×2688 (two EAC halves of 4032×1344); other spherical projection formats may be substituted with equal success, given the contents of the present disclosure. As shown in FIG. 10, one exemplary first segment 1000 includes a front facet of 1344×1344 and right and left facets of size 1408×1344. Unfortunately, most HEVC 5.1 hardware codecs only support hardware accelerated operation up to 4096 rows; larger row sizes trigger software emulated operation that is much slower (nearly 50× slower). Notably, the extra pixel columns in the right and left facets correspond to overlapping image data. In other words, each 32-pixel band contains 16-pixel columns of the post-stitched front fisheye that correspond to 16-pixel columns of the post-stitched back fisheye. More directly, after post-stitch blending, the size of modified EAC segment can be reduced to 4096×1344, which fits within the HEVC 5.1 commodity codec (4096×1344).

The appropriate blending function between the front camera and back camera can be determined by comparing and contrasting the two versions of the same image pixel. In this manner, the display device can smooth over differences in e.g., color, white balance, saturation, etc. As previously alluded to, the redundant image data is not for display and need not be e.g., complete or even contiguous. For example, at small distances the overlap region may include redundant image captures of a contiguous 64 pixel-width band (without decimation); but at large focal distances, the overlap region may include redundant image captures of the entire~10° which is decimated down to 64 pixel-width.

As shown in FIG. 10, the resulting first segment 1000 reconciles capture differences between the front and back fisheye to generate a blended segment 1050. The blended segment 1050 weights e.g., color, white balance, saturation, etc. so as to smooth over large exposure transition artifacts. The blended segment 1050 is 4032×1344 (e.g., the two 64-pixel width bands have been removed and need not be displayed).

Referring now back to FIG. 9, various embodiments of the present disclosure re-stitch only the identified critical location (the portion that includes a shear artifact). As previously described above, the blending process preserves high frequency information (edge data, and high contrast). High frequency information may be particularly helpful for identifying a discontinuity in edge and contrast (i.e., a shear). In other words, post-blended data preserves edge information which may improve edge detection during stitching and/or re-stitching. In some variants, blending occurs after an initial shear correction and may improve subsequent post-processing (e.g., re-stitching and re-blending at a higher quality.) In other variants, blending may be performed concurrently with shear correction.

In some variants, a full re-stitch is performed; the full re-stitch performs a "scan line" match (i.e., each pixel along the meridian is searched between the front and back hemispheres). In other variants, a re-stitch can be approximated based on just the salient points (e.g., edge/high contrast points, such as were highlighted in FIG. 5); such approximations may search for salient point matches, but the surrounding pixels are only linearly warped. Reducing the search space and using linear warping may greatly reduce overall processing burden but provides a less accurate stitch.

In one specific variant, the identified critical location is re-stitched using a 2D stitch. Even though two-dimensional (2D) stitching may be too computationally complex (and likely unnecessary) for an embedded device to perform in real-time over the entire meridian, a small enough subset of the meridian may not overwhelm the camera's processing and/or memory resources.

Figure 11:
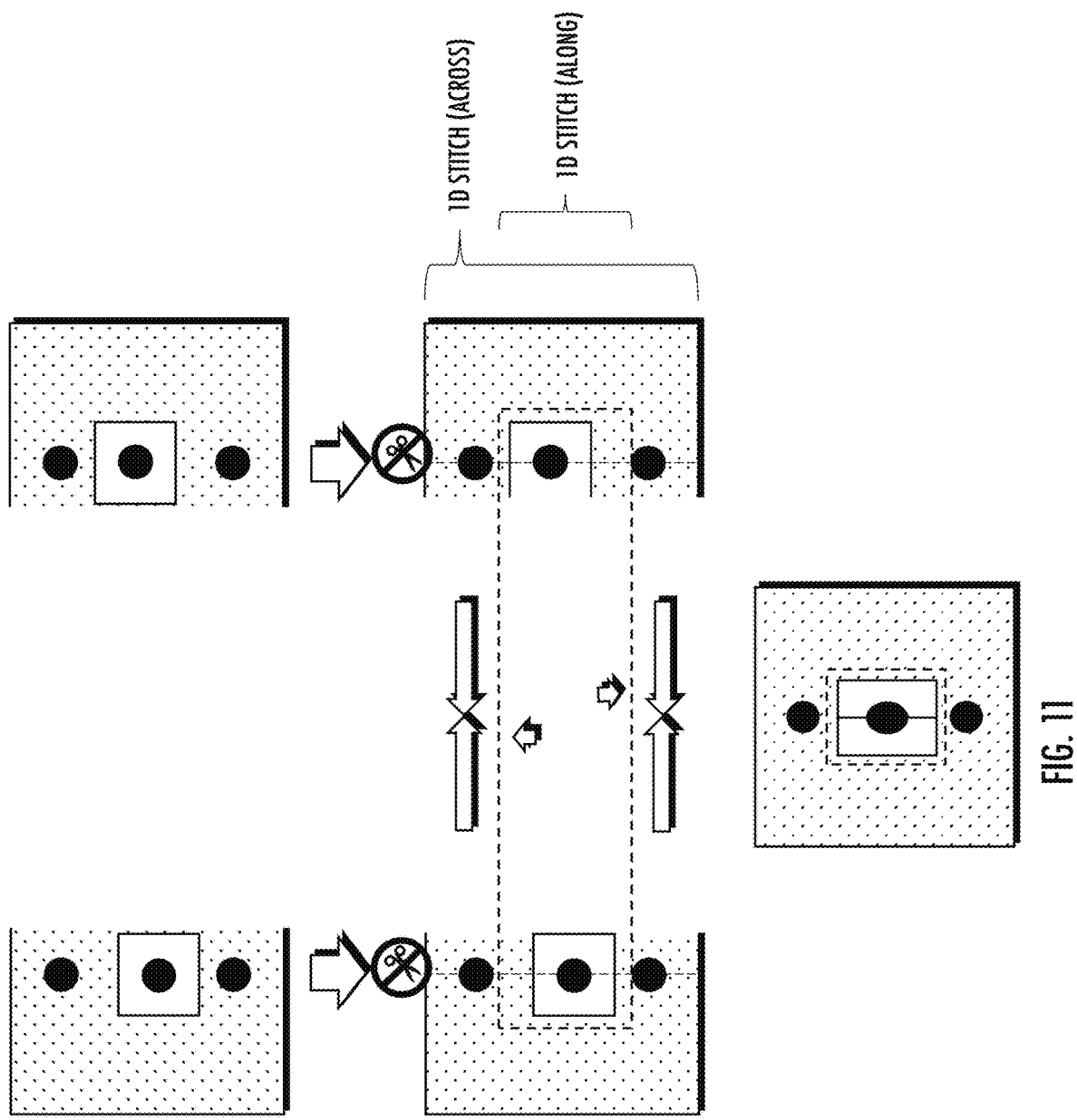
FIG. 11 is a graphical representation of one exemplary stitch, consistent with the various principles described herein.

FIG. 11 is a graphical representation of another exemplary stitch, consistent with the various principles described herein. As with the previous embodiments, the hyper-hemispherical image content is one-dimensionally (1D) stitched across the meridian of the spherical projection. However, instead of performing a 2D stitch, the camera may perform a 1D stitch along the meridian (running parallel with the meridian line) within the identified critical location.

As previously alluded to, a 1D stitch has a 1D search space (i.e., an array of pixels of size N). Notably, a shear that is more than N pixels away is not found, and thus will not be stitched. As a result, various embodiments of the present disclosure may perform a unidirectional 1D stitch, or a bi-directional 1D stitch, depending on e.g., image quality requirements, user configuration, device considerations (e.g., processing cycles, memory bandwidth, etc.) FIG. 12 illustrates the difference between unidirectional 1D stitching and bi-directional 1D stitching. As shown therein, the unidirectional 1D stitch may result in partial correction (e.g., only one edge is stretched to align with an edge found in the corresponding side), bi-directional 1D stitching may provide better results but with increased processing complexity.

More directly, one exemplary embodiment of the present disclosure uses two orthogonal 1D stitches: (i) latitudinally across the meridian and (ii) longitudinally along the meridian) to approximate the effect of a 2D stitch. Notably, the 1D stitch may be less precise than a true 2D stitch, however the image portion being stitched (e.g., the camera mount) is not the user's subject of interest and can be rendered much more loosely without adverse consequence. Additionally, as previously noted, the difference in computing complexity (e.g., in processing cycles, memory accesses, etc.) between a 1D stitch and a 2D stitch and the reduced stitching area enable operation within embedded devices.

As used herein, the term "orthogonal" refers to two or more vectors that have an inner product of zero. Two or more dimensions are orthogonal if their corresponding vector space is orthogonal. For example, a latitude vector is orthogonal to a longitudinal vector.

Various embodiments of the present disclosure additionally leverage the static nature of the camera mount to reduce processing complexity. In one exemplary embodiment, the relatively static and unchanging nature of the camera mount can be leveraged to minimize the frequency of re-stitch. More directly, the camera can re-stitch certain key frames, but "paint" over the shear in other video frames with the same re-stitched portion. For example, the in-camera 2D re-stitching may be stitched at slower rates than real-time (e.g., every other frame, every 10 frames, every 100 frames, etc.) further reducing processing burden.

In some variants, the frequency of re-stitching may be dynamically adjusted based on e.g., captured images and/or other device constraints. For example, action cameras may be exposed to a variety of situations where the ambient light is rapidly changing e.g., strobe lighting, etc.; under such situations, the re-stitch frequency may need to be relatively high so that the camera mount does not appear unnaturally lit/dark. In other situations, the ambient light may be slowly changing; re-stitch frequency can be greatly reduced, thereby reducing power consumption and processing load.

Moreover, various embodiments of the present disclosure may leverage the static nature of the camera mount to improve image correction and/or reduce the likelihood of errors introduced by false positives. As but one such example, rapidly changing lighting conditions may cause reflections and/or glints off the camera mount. The aforementioned stitching process has been heavily optimized for operation within an embedded device and may be less robust. Consequently, glints and reflections can introduce errors into the aforementioned blending process and downstream stitching (1D, 2D, etc.) Undesirable warp artifacts may further extend into the immediate vicinity of the stitch (this creates a noticeable "jiggling" visual effect in video).

Rather than use salient points on a frame-by-frame basis, one exemplary embodiment temporally smooths salient points to create a warp map that is specific to the critical location. In one such implementation, the temporal smoothing may be performed over a time window (e.g., ½ sec, ¼ sec, etc.) In other implementations, temporal smoothing may be based on frame windows (e.g., 8 frames, 15 frames, etc.) More generally, artisans of ordinary skill in the related art will readily appreciate that other forms of smoothing may be substituted with equal success, the foregoing being purely illustrative. Other common techniques may include e.g., low pass filtering the movement vectors for the critical location, blurring motion in the critical location, and/or other denoising techniques.

Methods

FIG. 13 is a logical flow diagram of a generalized method 1300 for shear correction in image projections.

At step 1302, one or more image(s) are linearly stitched together. In one exemplary embodiment, the images include wide field-of-view (FOV) data captured from two (2) hyperhemispherical cameras in a Janus orientation. Other implementations may use any number or combination of: e.g., cameras (e.g., 0, 1, 3, 4, etc.), sensors (sonar, lidar, radar, infrared), and/or other source data (e.g., computer models) as the material for stitching. More generally, while the foregoing discussions are presented in the context of image data, any visual media may be substituted by artisans of ordinary skill in the related art given the contents of the present disclosure. Examples of such media may include e.g., images, video, and/or any captured, rendered, and/or generated data (e.g., virtual or augmented reality data, sonar, lidar, infrared, and/or other electro-magnetic radiation.)

In one embodiment, the images include overlapping regions. In other embodiments, the images may just "touch" or even have gaps in coverage. Gaps in coverage may be extrapolated, filled, modeled, or otherwise padded with data. In one exemplary implementation, the degree of overlap, touch, and/or gap may be stored in metadata and/or provided for post-processing or other refinement.

As used herein, "stitching" refers to any combination of e.g., edge detection, motion detection, parallax correction, perspective warping, blending, lighting adjustment, and/or feature detection commonly used in the related art. Within the context of stitching, the term "linear" refers to image manipulations that assume mathematical linearity (e.g., scalar addition, multiplication, superposition, and/or any other linear property.) Linear stitching assumes that one or more contiguous pixels of one image correspond to one or more contiguous pixels of another image. In contrast, "non-linear" stitching must correct for non-contiguous pixels between images (i.e., one or more contiguous pixels in one image do not correspond to contiguous pixels in another image). Shearing and tearing are examples of non-linear artifacts for multi-camera photography, but analogous non-linear artifacts may be present in other applications. For example, augmented reality may need to combine computer generated images of infinite resolution with captured images having finite resolution; similarly, hybrid sensor applications (sonar, lidar, infrared, visible light, etc.) may have non-linear correspondences between different sensing modalities.

In one embodiment, linear stitching includes a 1D latitudinal stitch (across a seam) between two images. As previously described, the 1D latitudinal stitch can be combined in a subsequent pass with a 1D longitudinal stitch (along a seam). In some variants, latitudinal and/or longitudinal stitches may be further divided into directional passes, regions, frequency ranges, and/or other partitions. More generally, any tiered, hierarchical, or multi-pass stitching scheme may be substituted with equal success by artisans of ordinary skill in the related art, given the contents of the present disclosure. For example, a first past 2D stitch could be used within a system that mimics 3D stitching with a 2D1D stitch (stitching across area first, then a depth stitch). Similarly, blending/stitching for frequency components above/below a cutoff frequency may be split into different passes.

At step 1304, one or more critical location(s) in the stitched image are determined. As previously noted, the critical locations refer to portions of the stitched image that have, or are likely to have, objects within the critical distance. In one embodiment, the critical locations may be statically determined; for example, a camera with a known mounting location may have a statically defined critical location around the mounting location. In other embodiments, the critical locations may be dynamically determined; for example, a device may detect objects within the critical distance during a first 1D stitch, and dynamically refine the critical locations using an orthogonal 1D stitch.

In some embodiments, object depth may be actively sensed (e.g., via sonar, lidar, radar, etc.) In other embodiments, object depth may be inferred based on image data. For instance, a linear stitch may generate a warp track that can be used to infer distances from disparate viewpoints and triangulate an estimated depth. Notably, inferring depth from image data may introduce errors due to e.g., differences in exposure and/or lighting conditions between cameras. Certain implementations may additionally use temporal smoothing and/or blending data to augment and/or refine depth estimation. As previously noted, temporal smoothing can be used to correct for transitory lighting (e.g., glints of light, strobing, reflectivity, shadows, etc.) Similarly, blending information may provide quality metrics for edge detection information (edge detection can be improved with frequency/wavelet analysis).

Other techniques that may be useful for identifying non-linearities may include e.g., user input, artificial intelligence and/or machine learning. For example, a user may manually provide depth information. Similarly, machine learning algorithms may improve depth inferences through iterative processing of many different camera mounts/shooting conditions. More broadly, any technique for identifying portions of the image that are likely to have a non-linearity (e.g., a shear, a tear, or other discontinuous artifact) may be substituted with equal success by artisans of ordinary skill, given the contents of the present disclosure.

At step 1306, shear correction is performed in the critical location(s) of the image. Constraining shear correction to just the critical location(s) of an image may greatly reduce processing complexity. As but one such example, the meridian of a Janus configuration passes through four faces of an Equi-Angular Cubemap (EAC); thus, limiting shear correction to just the top and bottom face of the EAC cuts overhead in half, shear correction in just the bottom face is one fourth; further reductions (e.g., only the bottom 60°, 45°, 30°, etc.) result in proportionate reductions.

In one embodiment, the shear correction includes a 1D longitudinal stitch (along a stitching seam) of a 1D latitudinally stitched image. In other embodiments, the shear correction includes a 2D stitch. As previously noted, 1D1D stitching scales as a function of stitch length (O(N)), whereas 2D stitching scales as a function of stitch area (O($N^2$)); thus, 1D1D stitching is substantially faster than 2D stitching over any significant image size. Notably, however, certain image artifacts can introduce errors in one or both dimensions; consequently, 1D1D stitching is also more error prone than 2D stitching.

In view of the foregoing considerations, different implementations may trade-off different stitching techniques based on a variety of considerations including without limitation: processing complexity, memory usage, power consumption, image quality, latency, throughput, and/or other application specific considerations. As but one such example, a device may use 1D1D stitching for streaming applications, but use area constrained 2D stitching when latency is not an issue. As but another example, a device may use 1D1D stitching for certain frame rates/resolutions (e.g., 8 K@24 fps, 7 K@30 fps, 6 K30 fps, 5.6 K@30 fps) but provide 2D stitching for other frame rates/resolutions (e.g., 4 K@30 fps, etc.)

While the foregoing processes are described in the context of a single device performing shear correction, the exemplary multi-pass shear correction described herein may also be split across multiple devices. Such implementations may be particularly useful in legacy device ecosystems that lack the processing resources to perform shear correction natively.

Referring now to FIG. 14, logical flow diagrams 1400, 1450 of one exemplary implementation of split shear correction is shown. At step 1402, an action camera performs a 1D latitudinal stitch and determines critical location(s) in image(s). At step 1404, the camera uses the warp track generated from the 1D latitudinal stitch to start a 1D longitudinal stitch. Unfortunately, since the action camera lacks sufficient processing/memory/power resources to perform a full 1D1D stitch, it only performs a unidirectional longitudinal stitch (such as described above in FIG. 12). Thereafter, partially corrected image and metadata is provided to the user's smart phone to finish (steps 1406 and 1452).

At steps 1454 and 1456, the smart phone finishes the 1D longitudinal stitch and renders the resulting 1D1D stitched image. In some cases, the smart phone may additionally store the 1D1D stitched image and metadata for re-stitching (e.g., via a 2D stitching) or other post processing (step 1458).

While the foregoing split shear correction is presented in the context of a 1D1D shear correction, alternative implementations may extend the concepts to other analogs. For example, the camera could do a 1D in the top, right and left faces (which are unlikely to have shear artifacts), and a smart phone could perform a 2D stitch in the bottom face. More broadly, the various multi-pass shear correction embodiments may enable usage scenarios and/or legacy compatibility that would not be possible with existing single pass stitching schemes.

Additional Configuration Considerations

Throughout this specification, some embodiments have used the expressions "comprises," "comprising," "includes," "including," "has," "having" or any other variation thereof, all of which are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

As used herein any reference to any of "one embodiment" or "an embodiment", "one variant" or "a variant", and "one implementation" or "an implementation" means that a particular element, feature, structure, or characteristic described in connection with the embodiment, variant or implementation is included in at least one embodiment, variant or implementation. The appearances of such phrases in various places in the specification are not necessarily all referring to the same embodiment, variant or implementation.

As used herein, the term "computer program" or "software" is meant to include any sequence of human or machine cognizable steps which perform a function. Such program may be rendered in virtually any programming language or environment including, for example, Python, JavaScript, Java, C #/C++, C, Go/Golang, R, Swift, PHP, Dart, Kotlin, MATLAB, Perl, Ruby, Rust, Scala, and the like.

As used herein, the terms "integrated circuit", is meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the term "processing unit" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die or distributed across multiple components.

As used herein, the terms "camera" or "image capture device" may be used to refer without limitation to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

Upon reading this disclosure, those of skill in the art will appreciate still additional alternative structural and functional designs as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

It will be recognized that while certain aspects of the technology are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

It will be appreciated that the various ones of the foregoing aspects of the present disclosure, or any parts or functions thereof, may be implemented using hardware, software, firmware, tangible, and non-transitory computer-readable or computer usable storage media having instructions stored thereon, or a combination thereof, and may be implemented in one or more computer systems.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus configured to correct shear artifacts in image projections, comprising:
a first camera and a second camera;
a processor; and
a non-transitory computer-readable medium comprising one or more instructions which, when executed by the processor, causes the apparatus to:
capture a first image and a second image;
partially stitch the first image and the second image in at least a first dimension to create a partially stitched image;
generate a warp track based on the partially stitched image;
unidirectionally stitch the partially stitched image in a critical location, based on the warp track;
where the apparatus cannot stitch the first image and the second image in two dimensions with a single pass; and
provide the partially stitched image and the warp track to an other device.

2. The apparatus of claim 1, where the first camera and the second camera comprise hyper-hemispherical cameras that overlap at a meridian.

3. The apparatus of claim 2, where the first dimension is orthogonal to the meridian.

4. The apparatus of claim 1, where the apparatus further comprises a codec, where the first image and the second image exceed a size constraint of the codec, and where the partially stitched image fits the size constraint of the codec.

5. The apparatus of claim 1, where the one or more instructions are further configured to cause the apparatus to temporally smooth the warp track over one or more frames of video data.

6. The apparatus of claim 1, where the one or more instructions are further configured to cause the apparatus to re-project the partially stitched image into an Equi-Angular Cubemap spherical projection.

7. The apparatus of claim 6, where the critical location is within one face of the Equi-Angular Cubemap spherical projection.

8. A method for correcting shear artifacts comprising: stitching a first image and a second image in a first dimension to create a partially stitched image; determining a critical location within the partially stitched image; stitching the partially stitched image in a second dimension; where the stitching occurs within an apparatus that cannot stitch images in two dimensions with a single pass; and where the first dimension and the second dimension are orthogonal.

9. The method of claim 8, where the first image and the second image comprise an overlap region.

10. The method of claim 9, further comprising blending the overlap region to generate edge information, where stitching the partially stitched image in the second dimension is based on the edge information.

11. The method of claim 9, where stitching the first image and the second image in the first dimension creates a warp track.

12. The method of claim 11, where the critical location is determined based on the warp track.

13. The method of claim 12, where the warp track is temporally smoothed over one or more frames of video data.

14. The method of claim 8, further comprising re-projecting the partially stitched image into an Equi-Angular Cubemap spherical projection; and
where the critical location is determined within one face of the Equi-Angular Cubemap spherical projection.

15. An apparatus configured to correct shear artifacts in image projections, comprising:
a display;
a processor; and
a non-transitory computer-readable medium comprising one or more instructions which, when executed by the processor, causes the apparatus to:
obtain a partially stitched image from an other apparatus that cannot stitch images in two dimensions with a single pass, where the partially stitched image was stitched in a first dimension;
perform shear correction in a critical location of the partially stitched image to generate a corrected image; and
render the corrected image.

16. The apparatus of claim 15, where the corrected image comprises an Equi-Angular Cubemap spherical projection and the shear correction is performed within one face of the Equi-Angular Cubemap spherical projection.

17. The apparatus of claim 16, where the shear correction comprises a one-dimensional (1D) stitch orthogonal to the first dimension.

18. The apparatus of claim 17, where the one-dimensional (1D) stitch is unidirectional.

19. The apparatus of claim 16, where the shear correction comprises a two-dimensional (2D) stitch.

20. The apparatus of claim 19, further comprising a codec characterized by a size constraint, where the partially stitched image fits within the size constraint, and where the corrected image fits within the size constraint.

* * * * *